United States Patent
Chae et al.

(10) Patent No.: US 10,455,481 B2
(45) Date of Patent: Oct. 22, 2019

(54) METHOD AND DEVICE FOR TRANSMITTING AND RECEIVING DISCOVERY SIGNAL OF DEVICE-TO-DEVICE COMMUNICATION TERMINAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/572,262

(22) PCT Filed: May 9, 2016

(86) PCT No.: PCT/KR2016/004831
§ 371 (c)(1),
(2) Date: Nov. 7, 2017

(87) PCT Pub. No.: WO2016/182294
PCT Pub. Date: Nov. 17, 2016

(65) Prior Publication Data
US 2018/0124682 A1 May 3, 2018

Related U.S. Application Data

(60) Provisional application No. 62/158,554, filed on May 8, 2015.

(51) Int. Cl.
*H04W 48/08* (2009.01)
*H04L 1/00* (2006.01)
(Continued)

(52) U.S. Cl.
CPC .............. *H04W 48/08* (2013.01); *H04L 1/00* (2013.01); *H04L 5/0033* (2013.01);
(Continued)

(58) Field of Classification Search
CPC .. H04W 72/0446; H04W 48/08; H04W 8/005
See application file for complete search history.

(56) References Cited

U.S. PATENT DOCUMENTS

2013/0223353 A1   8/2013 Liu et al.
2014/0269558 A1*  9/2014 Sartori .................. H04W 48/16
                                                        370/329
(Continued)

FOREIGN PATENT DOCUMENTS

WO    WO 2016/020448 A1    2/2015
WO    WO 2015/065015 A1    5/2015

OTHER PUBLICATIONS

Huawei et al., "UE-to-Network Relay Discovery", 3GPP TSG RAN WG1 Meeting #80b, R1-151865, Belgrade, Serbia, Apr. 20-24, 2015, 4 pages.
(Continued)

*Primary Examiner* — Redentor Pasia
(74) *Attorney, Agent, or Firm* — Birch, Stewart, Kolasch & Birch, LLP

(57) ABSTRACT

An embodiment of the present invention relates to a method by which a terminal transmits a discovery signal in a wireless communication system, comprising the steps of: determining a subframe pool for data transmission; determining a subframe set for transmitting a D2D signal by applying a time resource pattern (TRP) bitmap to the subframe pool for the data transmission; and transmitting a discovery message in a subframe corresponding to the n number of bits of the TRP bitmap.

12 Claims, 9 Drawing Sheets

(51) Int. Cl.
    *H04W 8/00*     (2009.01)
    *H04W 72/04*     (2009.01)
    *H04W 76/14*     (2018.01)
    *H04L 5/00*     (2006.01)
    *H04W 56/00*     (2009.01)
    *H04W 48/16*     (2009.01)

(52) U.S. Cl.
    CPC .......... *H04L 5/0082* (2013.01); *H04L 5/0091* (2013.01); *H04W 8/005* (2013.01); *H04W 72/0446* (2013.01); *H04W 76/14* (2018.02); *H04L 5/001* (2013.01); *H04L 5/0023* (2013.01); *H04L 5/0048* (2013.01); *H04W 48/16* (2013.01); *H04W 56/0015* (2013.01)

(56) References Cited

U.S. PATENT DOCUMENTS

| | | | |
|---|---|---|---|
| 2014/0328329 | A1 | 11/2014 | Novlan et al. |
| 2015/0043448 | A1* | 2/2015 | Chatterjee ............ H04W 8/005 370/329 |
| 2015/0085764 | A1* | 3/2015 | Xiong ................... H04W 76/38 370/329 |
| 2015/0133102 | A1* | 5/2015 | Sorrentino ............ H04W 8/005 455/418 |
| 2015/0264588 | A1* | 9/2015 | Li ....................... H04W 56/0015 370/350 |
| 2016/0014589 | A1* | 1/2016 | Niu ....................... H04W 74/02 370/329 |
| 2016/0021483 | A1* | 1/2016 | Wei ......................... H04W 4/70 455/41.2 |
| 2016/0057604 | A1* | 2/2016 | Luo ........................ H04W 8/005 370/330 |
| 2016/0095099 | A1* | 3/2016 | Yang ........................ H04L 5/00 370/330 |
| 2016/0142898 | A1* | 5/2016 | Poitau ................... H04W 76/14 370/329 |
| 2016/0183167 | A1* | 6/2016 | Agiwal ............... H04W 72/042 370/329 |
| 2016/0249297 | A1* | 8/2016 | Oh ........................ H04W 76/14 |

OTHER PUBLICATIONS

Intel Corporation, "Type-1 Discovery Support in Partial and Out of Coverage Scenarios", 3GPP TSG RAN WG1 Meeting #80bis, R1-151440, Belgrade, Serbia, Apr. 20-24, 2015, pp. 1-4.

Qualcomm Incorporated, "Out-of-Coverage discovery for Public Safety", 3GPP TSG-RAN WG1 #80BIS, R1-151398, Belgrade, Serbia, Apr. 20-24, 2015, pp. 1-5.

Fujitsu, "Considerations on ProSe public safety discovery", 3GPP TSG-RAN WG2 Meeting#89bis, R2-151461, Bratislava, Slovakia, Apr. 20-24, 2015, pp. 1-4.

\* cited by examiner

FIG. 5
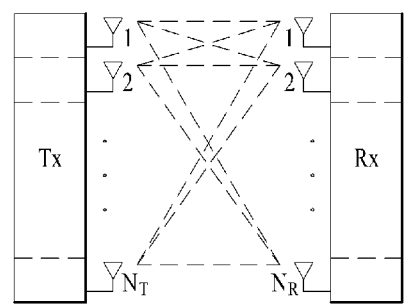
(a)
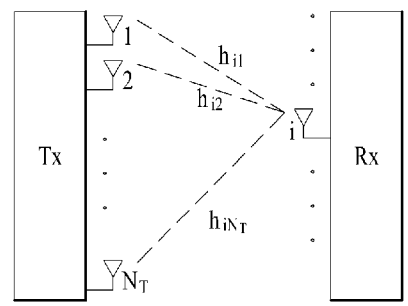
(b)

METHOD AND DEVICE FOR TRANSMITTING AND RECEIVING DISCOVERY SIGNAL OF DEVICE-TO-DEVICE COMMUNICATION TERMINAL IN WIRELESS COMMUNICATION SYSTEM

CROSS REFERENCE TO RELATED APPLICATIONS

This application is the National Phase of PCT International Application No. PCT/KR2016/004831, filed on May 9, 2016, which claims priority under 35 U.S.C. 119(e) to U.S. Provisional Application No. 62/158,554, filed on May 8, 2015, all of which are hereby expressly incorporated by reference into the present application.

TECHNICAL FIELD

Following description relates to a wireless communication system, and more particularly, to a method of transmitting and receiving a discovery signal extended in D2D communication and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Device-to-Device (D2D) communication means a communication system for directly exchanging audio, data and the like between user equipments without passing through a base station (evolved NodeB: eNB) by establishing a direct link between the user equipments. D2D communication may include such a system as a UE-to-UE (user equipment-to-user equipment) communication, Peer-to-Peer communication and the like. And, the D2D communication system may be applicable to M2M (Machine-to-Machine) communication, MTC (Machine Type Communication) and the like.

D2D communication is currently considered as one of schemes for setting a load put on a base station due to the rapidly increasing data traffic. For instance, according to D2D communication, unlike an existing wireless communication system, since data is exchanged between devices without passing through a base station, overload of a network can be reduced. Moreover, by introducing D2D communication, it is able to expect effects such as procedure reduction of a base station, power consumption reduction of devices involved in D2D, data transmission speed increase, reception capability increase of a network, load distribution, extension of cell coverage and the like.

DISCLOSURE OF THE INVENTION

Technical Task

A technical task of the present invention is to provide a method of transmitting a discovery signal including more information compared to a legacy discovery signal in a D2D communication.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting a discovery signal, which is transmitted by a user equipment in a wireless communication system, includes the steps of determining a subframe pool for transmitting data, determining a subframe set for transmitting a D2D signal by applying a TRP (time resource pattern) bitmap to the subframe pool for transmitting the data, and transmitting a discovery message in a subframe corresponding to the n number of bits among the TRP bitmap.

When a discovery signal is transmitted in the subframe corresponding to the n number of bits and when a data is transmitted only in the subframe corresponding to the n number of bits used for a D2D control channel, CRC masks used for the D2D control channel can be different from each other.

When a discovery signal is transmitted in the subframe corresponding to the n number of bits and when a data is transmitted only in the subframe corresponding to the n number of bits used for a D2D control channel, a DMRS sequence used for the D2D control channel can be different from a DMRS sequence transmitted in a subframe corresponding to the remaining bits.

A discovery signal can be transmitted in an RB of a predetermined size only in the subframe corresponding to the n number of bits.

A position of the n number of bits can be determined by one selected from the group consisting of an ID, an L2 SA (scheduling assignment) ID, and a discovery ID in the TRP bitmap.

A position of the n number of bits can be randomly determined by the user equipment from among positive integers equal to or less than quotient resulted from dividing the TRP bitmap by 4.

To further achieve these and other advantages and in accordance with the purpose of the present invention, according to a different embodiment, a method of receiving a discovery signal, which is received by a user equipment in a wireless communication system, includes the steps of determining a subframe set for receiving a D2D signal by applying a TRP (time resource pattern) bitmap to a subframe pool for transmitting a data, and receiving a discovery message in a subframe corresponding to the n number of bits among the TRP bitmap.

The user equipment recognizes that a discovery signal is transmitted in a subframe corresponding to the n number of bits through checking a CRC of the D2D control channel.

The user equipment can recognize that a discovery signal is transmitted in a subframe corresponding to the n number of bits via a DMRS sequence of a D2D control channel.

A discovery signal can be transmitted in an RB of a predetermined size only in the subframe corresponding to the n number of bits.

The user equipment can determine a position of the n number of bits using one selected from the group consisting of an ID, an L2 SA (scheduling assignment) ID, and a discovery ID in the TRP bitmap.

A position of the n number of bits can be randomly determined by the user equipment from among positive integers equal to or less than quotient resulted from dividing the TRP bitmap by 4.

Advantageous Effects

According to the present invention, it is able to transmit an extended discovery signal while reducing blind decoding burden of a UE.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for a configuration of a wireless communication system having multiple antennas;

BEST MODE

Mode for Invention

Figure 1:
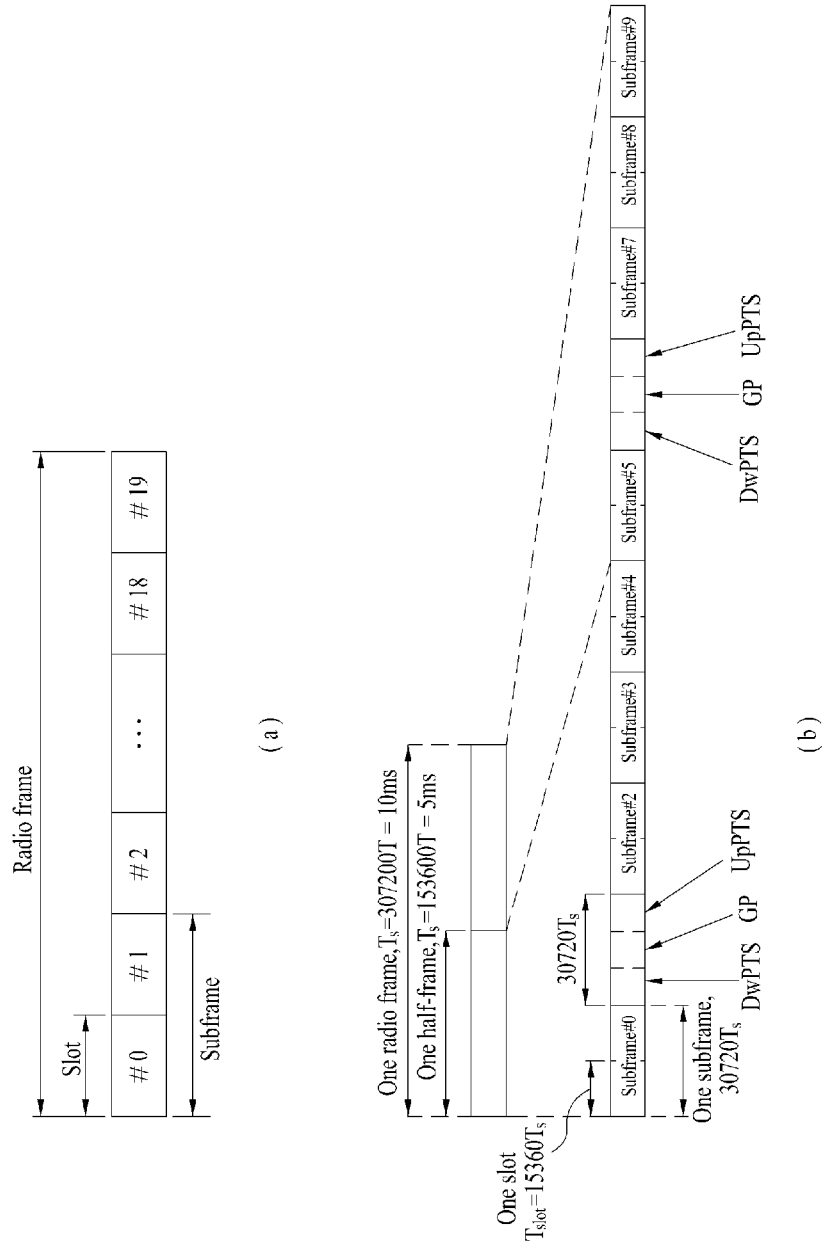
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS.

The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless Packet communication system, uplink and/or downlink data Packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
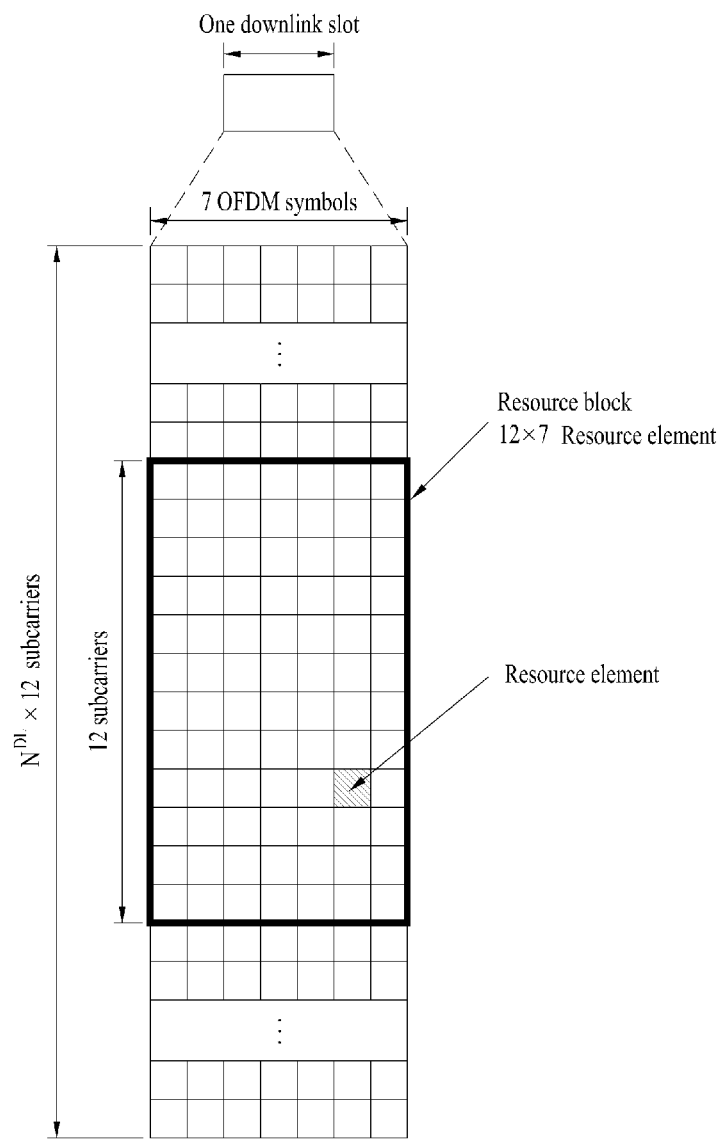
FIG. 2 is a diagram for a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
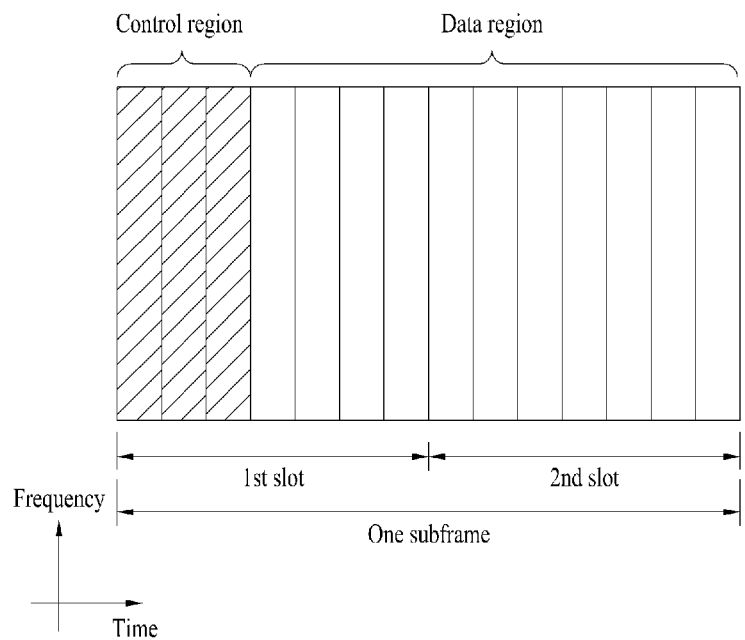
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
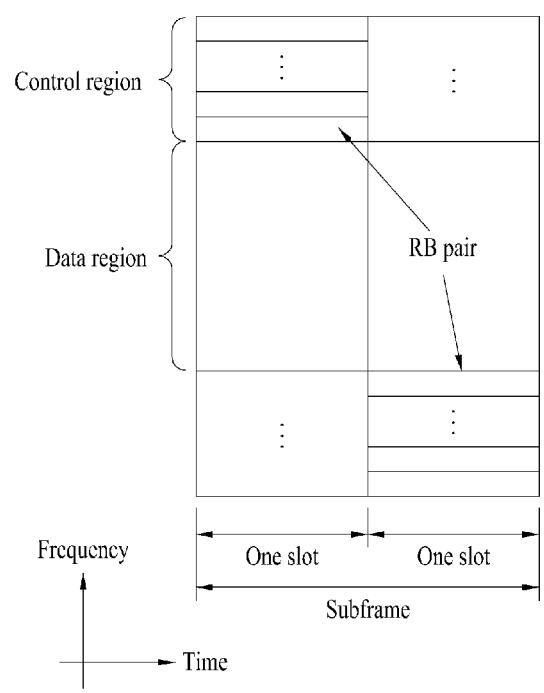
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a Packet is transmitted on a radio channel. In view of the nature of the radio channel, the Packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \qquad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s = [s_1, s_2, \ldots, s_{N_T}]^T \qquad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Assuming a case of configuring NT transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \qquad \text{[Equation 5]}$$

$$W\hat{s} = WPs$$

In Equation 5, $w_{ij}$ denotes a weight between an $i^{th}$ transmit antenna and $j^{th}$ information. W is also called a precoding matrix.

If the NR receive antennas are present, respective received signals $y_1, y_2, \ldots y_{N_R}$ of the antennas can be expressed as follows.

$$y=[y_1,y_2,\ldots,y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T=[h_{i1},h_{i2},\ldots,h_{iN_T}] \quad \text{[Equation 7]}$$

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

An AWGN (Additive White Gaussian Noise) is added to the actual channels after a channel matrix H The AWGN $n_1, n_2, \ldots, n_{N_R}$ respectively added to the NR receive antennas can be expressed as follows.

$$n=[n_1,n_2,\ldots,n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx+n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

Figure 6:
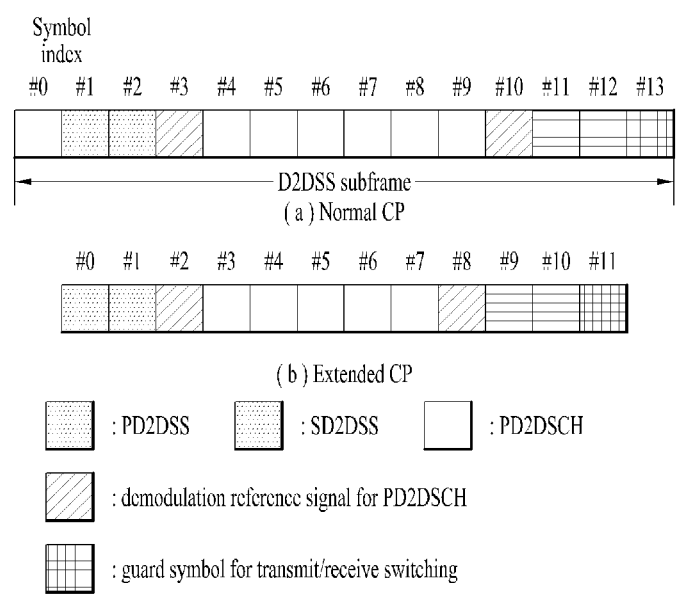
FIG. 6 is a diagram for a subframe in which a D2D synchronization signal is transmitted.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS). Unlike a DL PSS, the PD2DSS may use a different Zadoff-chu root index (e.g., 26, 37). And, the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
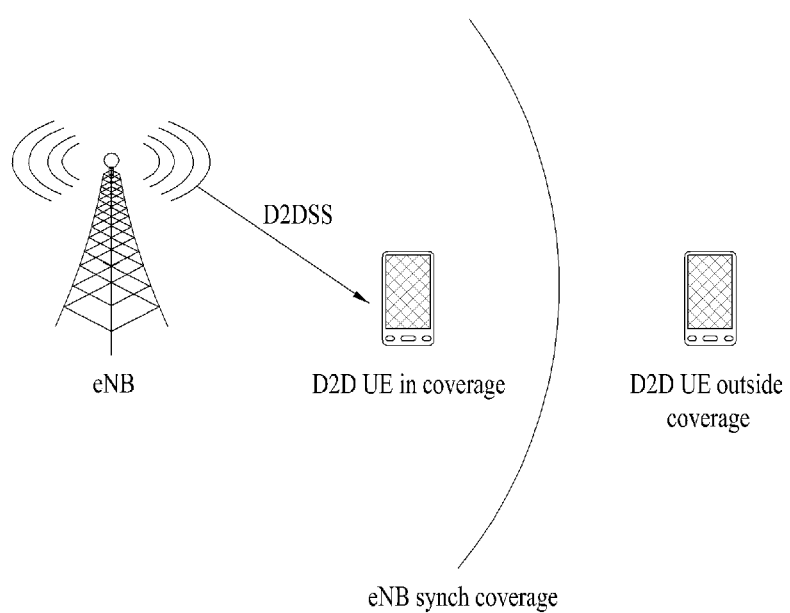
FIG. 7 is a diagram for explaining relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE.

D2D Resource Pool

Figure 8:
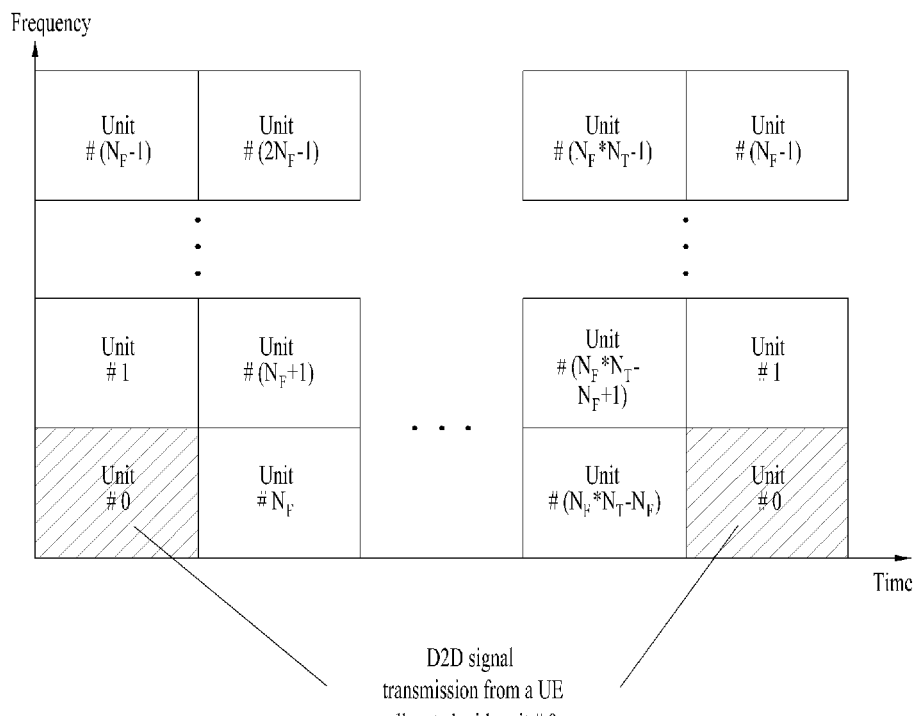
FIG. 8 is a diagram for an example of a D2D resource pool for performing D2D communication.

FIG. 8 shows an example of a UE1, a UE2 and a resource pool used by the UE1 and the UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include SA (scheduling assignment), a D2D data channel, and a discovery channel. The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a PSCCH (physical sidelink control channel). The D2D data channel (or, PSSCH (physical sidelink shared channel)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool. The discovery channel may correspond to a resource pool for a message that enables a neighboring UE to discover transmission UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

Transmission and Reception of SA

A mode 1 UE can transmit an SA signal (or, a D2D control signal, SCI (sidelink control information)) via a resource configured by an eNB. A mode 2 UE receives a configured resource to be used for D2D transmission. The mode 2 UE can transmit SA by selecting a time frequency resource from the configured resource.

Figure 9:
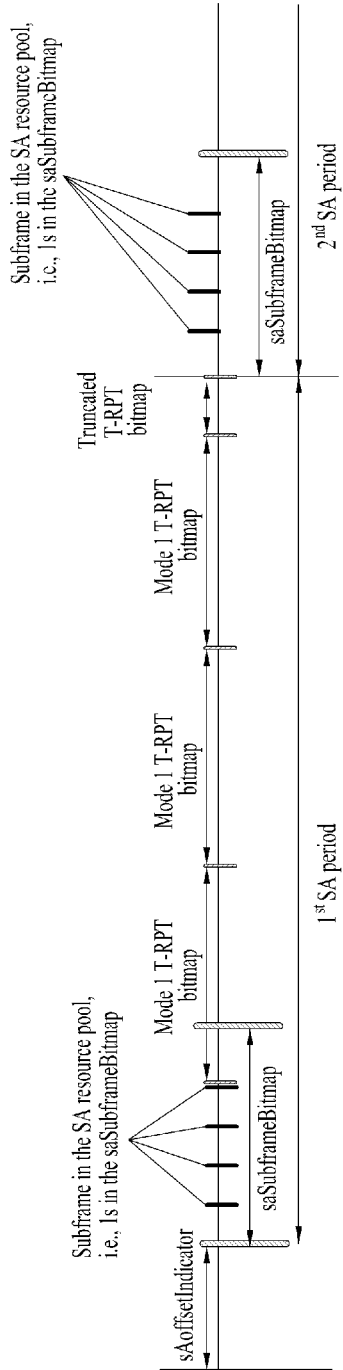
FIG. 9 is a diagram for explaining an SA period.

The SA period can be defined as FIG. 9. Referring to FIG. 9, a first SA period can start at a subframe apart from a specific system frame as much as a prescribed offset (SAOffsetIndicator) indicated by higher layer signaling. Each SA period can include an SA resource pool and a subframe pool for transmitting D2D data. The SA resource pool can include subframes ranging from a first subframe of an SA period to the last subframe among subframes indicated by a subframe bitmap (saSubframeBitmap) to transmit SA. In case of mode 1, T-RPT (time-resource pattern for transmission or TRP (time-resource pattern)) is applied to the resource pool for transmitting D2D data to determine a subframe in which an actual data is transmitted. As shown in the drawing, if the number of subframes included in an SA period except the SA resource pool is greater than the number of T-RPT bits, the T-RPT can be repeatedly applied and the lastly applied T-RPT can be applied in a manner of being truncated as many as the number of remaining subframes.

In the following, a method of transmitting a discovery signal is explained according to one embodiment of the present invention based on the aforementioned description, a legacy LTE standard document, and a known technology. In a legacy D2D communication, a length of a discovery message except a CRC corresponds to 232 bits. In case of performing relaying or out-coverage discovery, it may be necessary to have bits more than 232 bits to perform discovery. To this end, a new discovery format can be defined or a discovery message can be transmitted via a communication channel (PSSCH or PSCCH) (hereinafter, it can be referred to as DTC). In the following, each of DTC embodiments can be independently used. Or, at least two or more embodiments can be used in an aggregated form. For example, a PSCCH format defined for DTC can be transmitted in a separate resource pool defined for the DTC in a form that a DTC embodiment 2 and a DT embodiment 3 are combined with each other.

DTC Embodiment 1

As an embodiment of DTC, a discovery signal (MAC PDU of a discovery message) can be transmitted in a partial transmission opportunity only in an SA period. In other word, when a UE transmits D2D data (PSSCH) by applying a TRP, a part of the TRP can be used for discovery transmission. In particular, a part of bits of the TRP can be differently used to indicate discovery.

Specifically, the UE determines a subframe pool for transmitting data and applies a TRP (time resource pattern) bitmap to the subframe pool to determine a subframe set for transmitting a D2D signal. The UE transmits a discovery message in a subframe corresponding to the n number of bits of the TRP bitmap and may transmit no signal or D2D data in a subframe corresponding to the remaining bits of the TRP bitmap except the n number of bits.

In particular, if it is able to transmit a discovery signal and a D2D data at the same time in subframes indicated by the TRP bitmap, it may be necessary to have a method for a reception UE to identify a discovery signal transmitted on PSSCH. Specifically, a CRC mask of the PSCCH is differently configured when a discovery message is transmitted and (only) a data is transmitted. In this case, if the reception UE checks the CRC of the PSCCH, the reception UE is able to recognize that a discovery message is transmitted in a subframe corresponding to the n number of bits (of a subframe in which data is transmitted) of the PSCCH. Or, a DMRS and/or a scrambling sequence can be differently configured when a discovery message is transmitted and (only) a data is transmitted. In particular, a DMRS of PSCCH for transmitting a discovery message, and/or a DMRS of PSCCH for transmitting a scrambling sequence and data, and/or a scrambling sequence may different from each other. In this case, if the reception UE checks the DMRS and/or the scrambling sequence, the reception UE is able to identify whether the PSCCH is used for transmitting a discovery message or data. As a different example, when a discovery message is transmitted, it may use a predetermined MCS or an RB size. In particular, a discovery signal is transmitted in an RB of a predetermined size only in a subframe corresponding to the n number of bits. Or, it may use a state not used in communication for MCS or an RB size to indicate that a discovery signal is transmitted in the n number of subframes corresponding to a part of the PSSCH.

Or, if it is able to transmit a discovery signal and a D2D data at the same time in subframes indicated by the TRP bitmap, it may be necessary to have a method of distinguishing a discovery signal from a D2D data. Specifically, a CRC mask used for a subframe corresponding to the n number of bits may be different from a CRC mask used for a subframe corresponding to the remaining bits. In particular, a CRC mask of PSCCH is differently configured when a discovery message is transmitted and a data is transmitted. In this case, if the reception UE checks the CRC, the reception UE is able to distinguish the subframe corresponding to the n number of bits from the subframe corresponding to the remaining bits. Or, a DMRS and/or a scrambling sequence can be differently configured when a discovery message is transmitted and a data is transmitted. In particular, a DMRS sequence transmitted in a subframe corresponding to the n number of bits may be different from a DMRS sequence transmitted in a subframe corresponding to the remaining bits. In this case, if the reception UE checks a DMRS sequence, the reception UE is able to distinguish the subframe corresponding to the n number of bits from the subframe corresponding to the remaining bits. As a further different example, when a discovery message is transmitted, it may use a predetermined MCS or an RB size. In particular, a discovery signal is transmitted in an RB of a predetermined size only in a subframe corresponding to the n number of bits.

A discovery signal can be transmitted at the first N number of transmission opportunities only within an SA period. Or, it may be able to UE-specifically distinguish a subframe in which a discovery signal is transmitted in time. In particular, a transmission opportunity at which a discovery message is transmitted can be configured by a different position between UEs. In this case, if all UEs transmit a discovery message at a common position within an SA period, a reception UE can get rid of a constraint that the reception UE is unable to receive all discovery signals. And, it may be able to configure UEs to receive a mutual discovery message by distributing subframes (time resource) in which a discovery message is transmitted between the UEs. To this end, for example, a UE A transmitting a discovery message can transmit the discovery message from a first transmission opportunity to an $N^{th}$ transmission opportunity among transmission opportunities within an SA period. A UE B can transmit a discovery message from an $(N+1)^{th}$ transmission opportunity to a $2N^{th}$ transmission opportunity within an SA period. In order to determine transmission position of each UE, it may use a UE-specific ID or a UE group-specific ID such as an ID of a UE, an L2 SA ID, a discovery ID, and the like. In particular, in a TRP bitmap, a position of the n number of bits can be determined by one selected from the group consisting of an ID, an L2 SA (scheduling assignment) ID, and a discovery ID. Or, the position can be determined by a combination of two or more IDs. Or, a UE can randomly determine a position at which a discovery message is transmitted within an SA period. For example, it may be able to determine a rule that transmission opportunities within an SA period are divided by 4, a random number is selected from among numbers within quotient, and a discovery message is transmitted at a transmission opportunity corresponding to the selected random number. In particular, in the TRP bitmap, a UE can randomly determine a position of the n number of bits from among positive integers equal to or less than quotient resulted from dividing the TRP bitmap by 4. In this case, in order to make a reception UE clearly know a subframe position in which a discovery message of a specific UE is transmitted, it may assign a different PSCCH (destination) ID between UEs. In particular, a plurality of PSCCH IDs are assigned for DTC and a discovery signal is configured to be transmitted at a different PSSCH subframe position for each of a plurality of the PSCCH IDs.

DTC Embodiment 2

Since PSCCH is transmitted in a manner of including a destination (group) ID (L2 ID) of the PSCCH, only a destination UE group including the ID can decode a corresponding packet. Hence, when a discovery signal is transmitted via the PSCCH, it may be able to configure all UEs or a plurality of destination groups to receive the ID included in the PSCCH or it may define a separate PSCCH format to transmit new information by including the information in the newly defined PSCCH format. In particular, it may be able to group-commonly configure the ID included in the PSCCH. In this case, a legacy 1 RB PSCCH format 0 can be maintained. Or, if an ID corresponds to a specific state (e.g., all zero/all one), it may be able to determine a rule that all UEs receive PSCCH indicated by corresponding PSCCH.

Or, a legacy field (e.g., an MCS field and/or a frequency resource indication field) can be fixed by a specific state or can be used for the usage of indicating different information. For example, in case of PSSCH transmitted for DTC, since MCS or a frequency resource size is fixed by a specific number, the MCS field and/or the frequency resource field can indicate different information or can be fixed by a specific state without being used. A reception UE checks the MCS field and/or the frequency resource field fixed by a specific state and may be able to recognize that the PSCCH is transmitted for the DTC. And, although the ID included in the PSCCH is not a destination group ID of the reception UE, the reception UE can receive a packet for discovery reception. Or, when DTC does not operate in mode 1, a TA field can be used for the usage of a CRC by fixing the TA field by 0 all the time. As an example of configuring the frequency resource indicating field, in case of performing DTC, an RB size can be determined from among the N number of limited candidates. In this case, most part of the frequency resource indication field is not used and can be used for a different usage. In case of performing DTC, modulation is fixed by QPSK and the MCS field can be used for the usage of indicating different information. For example, since 64QAM is not used in current 3GPP Rel. 12/13 D2D, a part of 64 QAM states can be used for the usage of indicating DTC. A combination of a plurality of fields can indicate that PSCCH is used for DTC. For example, MCS may use either a state corresponding to 64QAM or a reserved state and a partial state of the frequency resource indication field can indicate that the PSCCH is used for the DTC.

DTC Embodiment 3

It may define a separate PSCCH resource pool for DTC. And, it may also separately define a PSSCH pool for DTC. Since a reception UE is able to know DTC via a resource pool, it may be able to reduce blind decoding burden performed on a plurality of PSCCHs of a different format in a single pool. To this end, a network can transmit a signal to a UE via physical layer signaling or higher layer signaling to indicate a usage of PSCCH and/or a PSSCH pool. Or, the information can be determined in advance according to each resource pool.

DTC Embodiment 4

It may define a new PSCCH format for DTC. If a DMRS of a PSCCH format 0 is used for performing measurement, since a bandwidth is too narrow (1 RB), measurement accuracy can be degraded. Hence, it may be able to define a PSSCH format transmitting in wideband.

Specifically, it may be able to define a new PSCCH format to have an RB size identical to an RB size of the legacy 1 RB PSCCH format and have a field configuration different from a field configuration of the legacy 1 RB PSCCH format. In particular, it may be able to define a PSCCH format of a higher coding rate in a manner of eliminating a partial field from the legacy PSSCH format or adding a new field to the legacy PSSCH format. For example, in case of DTC, MCS is used in a manner of being fixed and an MCS field and/or an ID field can be eliminated or fixed by a specific state. Similar to type 1 discovery, in case of using DL timing, a TA field can be eliminated or fixed by a specific state (all zero). In particular, since the TA field is long (11 bits), if the TA field is eliminated, it may be able to obtain a considerable amount of coding gain.

As a different example, it may be able to differently define a field configuration while a length of the legacy PSSCH format 0 is identically maintained. It may use zero padding to maintain the length. In this case, a CRC can be differently set to the PSSCH format 0 and a format for DTC to differently perform field interpretation.

It may be able to newly define a PSCCH format for DTC. For example, it may introduce PSCCH of 2 RBs or 4 RBs. It may be able to configure a plurality of group destination IDs to receive PSSCH by adding a plurality of ID fields. If DMRS measurement is performed on a lengthened RB, since the number of samples increases in frequency domain, it may be able to obtain a measurement result in a shorter time period.

DTC Embodiment 5

PSCCH for DTC can introduce CRC masking different from a PSCCH format 0 irrespective of a length or a field configuration of a format. A reception UE can distinguish the PSCCH format 0 from the PSCCH for DTC by checking a CRC. In particular, when the PSCCH format for DTC is identical to a legacy PSCCH format, the reception UE can distinguish formats from each other without additional blind decoding. For example, while the legacy PSCCH format 0 does not perform separate CRC masking, the PSCCH format newly defined for DTC can configure CRC masking with a specific bit state (e.g., (1,0,1,0, . . . , 1,0,1,0)). Or, the PSCCH format for DTC may use two CRC masking different from each other for the legacy PSCCH format.

DTC Embodiment 6

A DMRS or a scrambling sequence generated for PSCCH for DTC can be configured in a manner of being different from a PSCCH format 0. For example, assume a case that a pool of the PSCCH format 0 is partially overlapped with a pool in which the PSCCH format for DTC is transmitted. When PSCCHs of the same size are decoded, since the same DMRS is used, SFN (single frequency network) transmission is performed on a DMRS of PSCCH for discovery and a DMRS of PSCCH for communication (in other word, since DMRS sequences for transmitting a signal of a different purpose are the same, if the DMRS sequences are transmitted in a manner of being overlapped, it is difficult to distinguish DMRSs from each other). As a result, no signal can be properly decoded. In this case, it may be able to separate channels from each other by distinguishing DMRS sequences or scrambling sequences from each other according to a purpose to perform decoding separately.

Table 1 in the following shows factors used for generating a DMRS of a legacy PSCCH/PSSCH and a scrambling sequence.

TABLE 1

|  | Scrambling | | | DMRS base sequence | | | | DMRS | |
|---|---|---|---|---|---|---|---|---|---|
|  | Cell ID | RNTI | Slot number | Codeword index | Group hopping | Sequence hopping | Delta shift | Cell ID | CS | OCC |
| Discovery | 510 | Independent of UE ID Fixed to 0 | Independent of the slot number Fixed to 0 | Fixed to 0 | Disabled | Disabled | 0 | 510 | 0 | Fixed to [11] |
| SA | 510 | Independent of UE ID Fixed to 0 | Independent of the slot number Fixed to 0 | Fixed to 0 | Disabled | Disabled | 0 | 510 | 0 | Fixed to [11] |
| DATA | 510 | SA ID | FFS | Fixed to 0 | Enabled | Disabled | 0 | SA ID | By SA ID bit 1, 2, 3 | By SA ID bit 0 |

In this case, a UE transmitting PSCCH/PSSCH for DTC may use a different value (e.g., 511) rather than 510 for a DMRS and a cell ID part of scrambling. A DMRS sequence is generated using an SA ID in PSSCH. In this case, the DMRS sequence may use a predetermined ID or an ID for DTC. Similarly, CS/OCC of PSSCH may use a separate ID for DTC instead of a group destination ID.

DTC Embodiment 7

Each of the aforementioned embodiments can be used for a case of configuring a separate PSCCH resource pool. Yet, each of the aforementioned embodiments can be used for a pool of a legacy PSCCH format 0 as well. In this case, in order to lower blind decoding complexity of a UE, a PSCCH resource pool can be divided into a plurality of sub-pools. For example, it may be able to configure a resource for transmitting a new PSCCH format in a partial resource region of frequency domain, a partial resource region of time domain, or a partial resource region of time-frequency combination.

As a specific method, a frequency resource is divided into the N number of regions and the M (<N) number of regions among the N number of regions can be configured as regions in which PSCCH for transmitting DTC is transmitted. Or, a part of subframes can be configured as a subframe for transmitting PSCCH for DTC. Or, a part of a combination between a subframe (time) and a subband (frequency) can be configured as a resource for transmitting PSCCH for DTC. As an example of implementing the abovementioned scheme, a part of SA resources can be configured as a resource for transmitting DTC. In this case, a PSSCH (data) region can also be configured by one of the aforementioned schemes (time, frequency, time+frequency).

In the following, measurement of a relay UE in DTC is explained according to embodiment of the present invention based on the aforementioned description.

Measurement Embodiment 1—Measuring Reception Power Applied to DMRS of PSCCH

Since a PSCCH format 0 transmits PSCCH two times only per SA period via 1 RB, it is necessary to measure PSCCH for a considerable amount of time to secure measurement accuracy. Hence, it may be able to determine a rule that it is necessary to measure DMRS of PSCCH during minimum X number of SA periods to perform reliable measurement. Hence, if a separate PSCCH pool is configured for DTC, a repetition count can be increased to a value (e.g., 4 times) greater than two times. If a new PSCCH format is defined, it may use an RB size (>=N RB, e.g., N=4 or 6) for performing reliable measurement rather than 1 RB.

According to current PSCCH, all UEs are configured to use the same DMRS. Hence, when DMRS averaging is performed between UEs, it is preferable to perform the averaging on DMRSs of which L2 ID is the same or DMRSs of which a source ID is the same only. If a separate PSCCH pool or a sub-pool is configured for DTC and an ID of PSCCH includes all or a part of a source ID component in a corresponding region, it may be able to perform measurement averaging between DMRSs of which a source ID is the same.

Measurement Embodiment 2—Measuring Reception Power Applied to DMRS of PSSCH

As mentioned in the foregoing description, a reception UE is able to know a position at which PSSCH is transmitted using a TRP indicated by PSCCH. In this case, it is able to measure reception power of a DMRS of the position at which the PSSCH is transmitted. Yet, a bandwidth of the PSCCH may change in every SA period. The bandwidth of the PSCCH can be measured only when averaging is performed within an SA period. If averaging is performed between SA periods, the averaging can be performed by normalizing an RB size. For example, when 4 RB PSSCH is transmitted in an SA period #n and 6 RB PSSCH is transmitted in an SA period #n+1, it may add up measurement values normalized by 1 RB. This is the average measurement per sample performed by normalizing measurement using the number of samples used for the measurement. In case of the latter case, averaging is performed on measurement irrespective of the number of samples. (Or, it may average a measurement result without normalizing.)

Meanwhile, if transmission is performed on a too narrow band, it may have an incorrect measurement result. Hence, measurement can be performed only when an RB size belongs to a prescribed range. For example, measurement can be performed only when an RB size is equal to or greater than A RB and equal to or less than B RB. If the RB size does not belong to the abovementioned range, measurement is not performed. Meanwhile, Tx power may change in every SA period in mode 1. In this case, although it is able to perform averaging on different power, if Tx power is included in MAC header of a packet, a UE may measure a genuine channel only except a Tx power value. Or, it may perform measurement averaging irrespective of transmit power. This is because, since a Tx UE is able to increase transmit power for a wider discovery range, discovery measurement can be performed in consideration of the increased transmit power.

In case of performing measurement while transmit power is excluded, it may have a merit in that it is able to measure a genuine channel state between D2D UEs.

It may be able to regulate a TX UE to perform PSSCH TX of N RBs during at least prescribed time (e.g., X number of transmission opportunities) for reliable measurement. As an embodiment, it may consider a case that the N corresponds to 6 RBs. If the N is determined by 6, it may be able to reduce UE complexity in the aspect of possibility capable of having a structure identical to PSBCH measurement. For example, if a BW on which PSSCH is transmitted is configured by 4 RBs, a DTC message or PSSCH of a certain number is transmitted using 6 RBs and the remaining PSSCH is transmitted using 4 RBs. In this case, although a start point of frequency resource allocation is identical to a point indicated by PSCCH, an end point is extended up to 6 RB region when transmission is performed using 6 RBs. In this case, if it deviates from a frequency domain of a D2D resource pool, it may be difficult to perform transmission. Hence, it may perform transmission using 4 RBs in a corresponding subframe.

Meanwhile, a region (X number of transmission opportunities) configured to perform transmission using N RB can be UE-commonly determined in advance. Or, it may determine a rule that transmission is performed at a different position according to a UE. For example, X numbers of transmissions are performed using N RB at a position interlocked with a UE ID among transmission opportunities within an SA period. In this case, a value of the X can be determined by a multiple of a repetition count in order not to change an RB size in the middle of transmitting MAC PDU. And, a start point of the X numbers of transmissions can be determined by a multiple unit of the repetition count. Although the X numbers of transmissions correspond to continuous transmission opportunities, the X numbers of transmissions can be determined by a predetermined discontinuous pattern. In this case, a repetition count unit may have a continuous form in order not to change an RB size in the middle of transmitting an MAC PDU.

The abovementioned methods can be selectively applied only when transmission is performed using RBs equal to or less than N RBs. Since the methods intend to secure measurement accuracy during a prescribed period when transmission is performed using a too small RB size, if an allocated RB size is big enough, since it is able to secure sufficient measurement accuracy, it is not necessary to perform an additional operation.

Meanwhile, if transmission is performed using a too wide band, power for the transmission can be restricted. In this case, quality per RE can be considerably degraded. Hence, it may apply the abovementioned principle as well. In particular, it may transmit partial PSSCH using N RBs.

Meanwhile, as a variation of the abovementioned scheme, it may be able to transmit a DMRS only using N RBs rather than differently configure a packet for PSSCH transmission. In this case, regions to which the DMRS is transmitted can be aligned on the basis of a start point, an end point, or a center RB of frequency resource allocation in which data is transmitted. According to the present scheme, a DMRS of a certain size is transmitted to secure measurement accuracy and a codeword of actual data is fixed by a size indicated by PSCCH to prevent encoding from being performed on various sizes.

A method of performing transmission on PSSCH using an RB size of N RBs (e.g., N=6) during a prescribed period within an SA period can be extremely extended as follows. It may be able to determine a rule that transmission using N RBs is performed in all transmissions within the SA period. In other word, when PSSCH is transmitted using DTC, a minimum RB size may correspond to N RBs (e.g., N=6). Or, when PSSCH is transmitted using DTC, an RB size can be fixed by N RBs all the time. As mentioned in the foregoing description, the present method has a merit in that PSBCH DMRS measurement and commonality are maintained and UE implementation is simplified.

Meanwhile, if measurement is performed on a packet in which all PSSCHs are transmitted only, an RB size may change between a DTC packet and a data packet. In this case, measurement averaging can be performed on all packets or averaging can be performed on the DTC packet only. If measurement averaging is performed on all packets, it may apply the aforementioned normalization per RB size.

Measurement Embodiment 3—Performing Averaging on Same Source ID Only

Meanwhile, when UEs different from each other perform DTC, if a reception UE performs averaging without a distinction of a UE, it is unable to perform relay UE selection. Hence, it is necessary to perform separate averaging according to a UE. In order to perform measurement according to a UE, it may use methods described in the following.

First of all, it may perform averaging on PSSCH including the same ID on PSCCH. This method can be applied when it is able to set a source UE-specific ID to PSCCH. As mentioned in the foregoing description, if a separate resource pool is defined for DTC, an ID included in PSCCH can be configured as a source ID. Having received the source ID, all UEs can perform measurement averaging on PSSCH/PSCCH having the same source ID only.

Second, a source ID is checked via a higher layer signal and measurement averaging can be performed on a DMRS of PSSCH/PSCCH having the same ID only. If a destination ID is continuously used as an ID of PSCCH or a UE group common ID is used, it may be difficult to identify a source UE via the PSCCH ID. In this case, it may consider a method that a source ID is obtained from higher layer and measurement averaging is performed on a DMRS of PSCCH/PSSCH only transmitted by a UE having the same source ID.

Meanwhile, in the foregoing description, actual PSCCH/PSSCH transmission may not be performed due to WAN or SLSS transmission. In this case, if a DMRS of not transmitted PSCCH/PSSCH is measured, it may have an incorrect measurement result. In order to prevent this, it may consider a method of performing averaging only when RSRP is equal to or greater than a prescribed threshold or a method of measuring (averaging) a DMRS included in CRC passed packets only. In this case, it may be able to determine a rule that the averaging is performed only when a CRC corresponds to a CRC transmitting a discovery message among the CRC passed packets.

Meanwhile, when separate measurement is performed on DTC of all UEs, if the number of UEs increases, a memory for performing the measurement (a memory for storing a measurement value) can be excessively increased. In order to prevent excessive UE implementation, the maximum number of measurement values stored in the memory can be restricted to a prescribed number (the number can be UE-commonly determined by a specific value in advance or each UE may have different capability). In this case, a measurement result value can be discarded from the firstly measured value in FIFO (first input first output) scheme. Or, when a UE performs measurement, it may be able to determine a rule that DTC of a relay UE preferentially stores a measurement value. If the DTC of the relay UE and DTC of a different purpose coexist, a measurement value of the relay UE is preferentially stored to help relay path selection in the future.

Examples for the aforementioned proposed methods can also be included as one of implementation methods of the present invention. Hence, it is apparent that the examples are regarded as a sort of proposed schemes. The aforementioned proposed schemes can be independently implemented or can be implemented in a combined (aggregated) form of a part of the proposed schemes. It may be able to configure an eNB to inform a UE of information on whether to apply the proposed methods (information on rules of the proposed methods) via a predefined signal (e.g., physical layer signal or upper layer signal).

Configurations of Devices for Embodiments of the Present Invention

Figure 10:
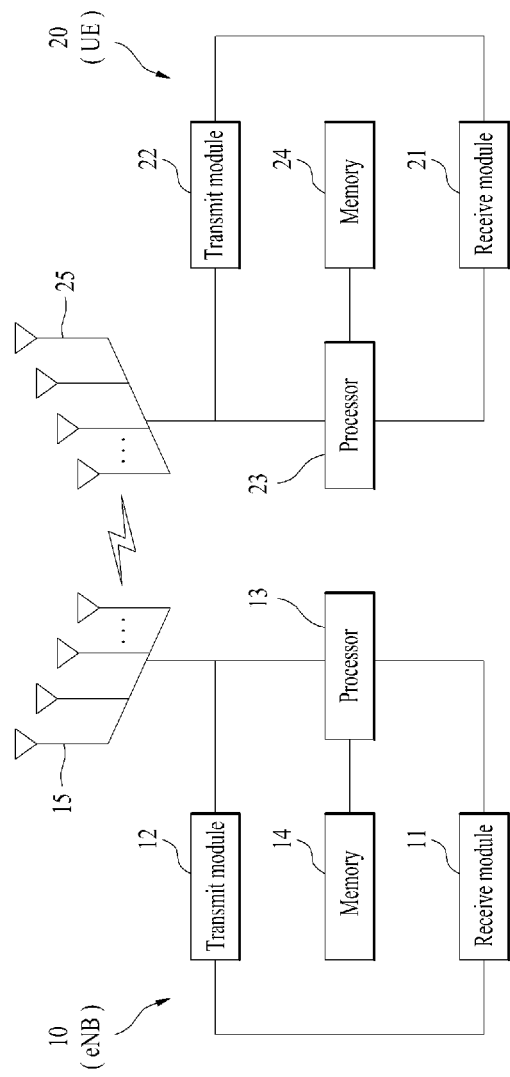
FIG. 10 is a diagram for configurations of a transmitter and a receiver.

FIG. 10 is a diagram for configurations of a transmitter and a receiver.

Referring to FIG. 10, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 10, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 10 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention can be applied to various mobile communication systems.

What is claimed is:

1. A method of transmitting a discovery signal, by a user equipment (UE) in a wireless communication system, the method comprising:
  determining a subframe set for transmitting a discovery signal indicated by a time resource pattern (TRP) bitmap in a resource pool for transmitting device-to-device (D2D) data;
  determining a subframe for transmitting the discovery signal based on a length of the discovery signal among a first subframe included in the subframe set and a second subframe included in a discovery resource pool allocated from a base station, wherein the first subframe is n subframes indicated by n bits among bits included in the TRP bitmap, where n is a positive integer; and transmitting the discovery signal in the determined subframe, wherein when the length of the discovery signal is greater than a predetermined length, the subframe for transmitting the discovery signal is determined as the first subframe.

2. The method of claim 1, wherein when the discovery signal or the D2D data is transmitted in the first subframe, the UE transmits a D2D control channel related to the first subframe, and wherein a cyclic redundancy check (CRC) mask for the D2D control channel when the discovery signal is transmitted in the first subframe is different from a CRC mask for the D2D control channel when the D2D data is transmitted in the first subframe.

3. The method of claim 1, wherein when the discovery signal or the D2D data is transmitted in the first subframe, the UE transmits a D2D control channel related to the first subframe, and wherein a demodulation reference signal (DMRS) sequence for the D2D control channel when the discovery signal is transmitted in the first subframe is different from a DMRS sequence for the D2D control channel when the D2D data is transmitted in the first subframe.

4. The method of claim 1, wherein the discovery signal is transmitted in a resource block (RB) of a predetermined size in the first subframe.

5. The method of claim 1, wherein a position of the n bits is determined by one selected from the group consisting of an identifier (ID), a layer 2 (L2) ID, an L2 scheduling assignment (SA) ID, and a discovery ID in the TRP bitmap.

6. The method of claim 1, wherein a position of the n bits is randomly determined by the UE from among positive integers equal to or less than a quotient that results from dividing the TRP bitmap by 4.

7. A method of receiving a discovery signal, which is received by a user equipment (UE) in a wireless communication system, the method comprising:

determining a subframe set for receiving a discovery signal indicated by a time resource pattern (TRP) bitmap in a resource pool for transmitting device-to-device (D2D) data; and receiving a discovery signal in a first subframe included in the subframe set or in a second subframe included in a discovery resource pool allocated from a base station, wherein when the discovery signal is received in the first subframe, the discovery signal has a length greater than a predetermined length, and wherein the first subframe in which the discovery signal is received is n subframes indicated by n bits among bits included in the TRP bitmap, where n is a positive integer.

8. The method of claim 7, wherein when the discovery signal or the D2D data is transmitted in the first subframe, the UE receives a D2D control channel related to the first subframe, and wherein the UE recognizes that the discovery signal is transmitted in the first subframe through checking a cyclic redundancy check (CRC) of the D2D control channel.

9. The method of claim 7, wherein when the discovery signal or the D2D data is transmitted in the first subframe, the UE receives a D2D control channel related to the first subframe, and wherein the UE recognizes that the discovery signal is transmitted in the first subframe through a demodulation reference signal (DMRS) sequence of a D2D control channel.

10. The method of claim 7, wherein the discovery signal is transmitted in a resource block (RB) of a predetermined size in the first subframe.

11. The method of claim 7, wherein a position of the n bits is determined using one selected from the group consisting of an identifier (ID), a layer 2 (L2) ID, an L2 scheduling assignment (SA) ID, and a discovery ID in the TRP bitmap.

12. The method of claim 7, wherein a position of the n bits is randomly determined by the UE from among positive integers equal to or less than a quotient that results from dividing the TRP bitmap by 4.

* * * * *